United States Patent
Joyce et al.

(10) Patent No.: US 8,171,046 B1
(45) Date of Patent: May 1, 2012

(54) CONVERTING CQL QUERY RESULTS INTO USER-CONTROLLABLE OBJECTS

(75) Inventors: Scott Joyce, Foxboro, MA (US); Thiago da Silva, Westborough, MA (US); Binbin Liu, West Boylston, MA (US); Keithley R. Sutton, Blackstone, MA (US); Munish Desai, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 316 days.

(21) Appl. No.: 12/493,876

(22) Filed: Jun. 29, 2009

(51) Int. Cl.
*G06F 7/00* (2006.01)
(52) U.S. Cl. .................................................. 707/769
(58) Field of Classification Search .................. 707/713, 707/769, E17.061, E17.069, E17.129, 999.003
See application file for complete search history.

(56) References Cited

U.S. PATENT DOCUMENTS

| | | | | |
|---|---|---|---|---|
| 6,571,282 B1 * | 5/2003 | Bowman-Amuah | .......... | 709/219 |
| 6,976,262 B1 * | 12/2005 | Davis et al. | .................... | 719/328 |
| 7,383,552 B2 * | 6/2008 | Hudis et al. | .................... | 719/316 |
| 7,502,669 B1 | 3/2009 | Evans et al. | | |
| 7,634,496 B1 | 12/2009 | Evans | | |
| 7,653,652 B2 * | 1/2010 | Kagalwala et al. | .... | 707/999.103 |
| 7,685,561 B2 * | 3/2010 | Deem et al. | .................... | 717/104 |
| 7,739,688 B1 | 6/2010 | Evans | | |
| 2003/0095145 A1 * | 5/2003 | Patrizio et al. | ................. | 345/764 |
| 2004/0083274 A1 | 4/2004 | Katiyar et al. | | |
| 2005/0114318 A1 | 5/2005 | Dettinger et al. | | |
| 2007/0266369 A1 * | 11/2007 | Guan et al. | .................... | 717/116 |
| 2007/0299951 A1 * | 12/2007 | Krithivas | ...................... | 709/223 |
| 2008/0027788 A1 | 1/2008 | Lawrence et al. | | |
| 2010/0082656 A1 | 4/2010 | Jing et al. | | |

OTHER PUBLICATIONS

"CQL: Contextual Query Language (SRU Version 1.2 Specifications)." Aug. 22, 2008. http://www.loc.gov/standards/sru/specs/cql.html, visited on Jun. 8, 2009.
Scott Joyce, et al., "Object Searching in Data Storage Systems," U.S. Appl. No. 12/493,883, filed Jun. 29, 2009.

* cited by examiner

*Primary Examiner* — Robert Timblin
*Assistant Examiner* — Randall Burns
(74) *Attorney, Agent, or Firm* — BainwoodHuang

(57) ABSTRACT

A method is provided. The method includes (a) sending, from a client device to a data storage system, a query regarding elements of the data storage system, (b) receiving, at the client device, from the data storage system, a query result, the query result containing information about a set of elements within the data storage system presented in tabular format, the set of elements being defined by the query, (c) parsing the query result, at the client device, to obtain a class object representing an element of the set of elements, and (d) performing an operation associated with the element on the class object. Corresponding apparatus and computer program products are also provided.

2 Claims, 7 Drawing Sheets

Fig. 2

```
<?xml version="1.0" ?>

...

<MULTIREQ>
<SIMPLEREQ>
<IMETHODCALL NAME="ExecuteQuery" >
<LOCALNAMESPACEPATH>

<NAMESPACE NAME=    />
...
</LOCALNAMESPACEPATH>

<IPARAMVALUE NAME="QueryLanguage"><VALUE>CQL</VALUE></
IPARAMVALUE>

<IPARAMVALUE NAME="Query">
<VALUE>

SELECT OBJECTPATH(DiskDevice), DiskDevice.Name,         ← 62
DiskDevice.Capacity, DiskDevice.CurrentSpeed, DiskDevice.Vendor,
DiskDevice.RAIDGroupID, RAIDGroup.NumberOfLUNs FROM DiskDevice, RAIDGroup     ← 64

WHERE DiskDevice.RAIDGroupID = RAIDGroup.RAIDGroupID AND
      DiskDevice.Capacity > 1000000000000 AND
      DiskDevice.Vendor  LIKE "Seagate"
                                                        ← 66
</VALUE>
</IPARAMVALUE>

</IMETHODCALL></SIMPLEREQ></MULTIREQ>     ← 58
...
```

| Prop. Name 1 | Prop. Name 2 | Prop. Name 3 | . . . | Prop. Name X |
|---|---|---|---|---|
| VALUE | VALUE | VALUE | | VALUE |
| VALUE | VALUE | VALUE | | VALUE |
| | | ⋮ | | |
| VALUE | VALUE | VALUE | | VALUE |

70 → (header row)
72(a) →
72(b) →
72(m) →
68
52

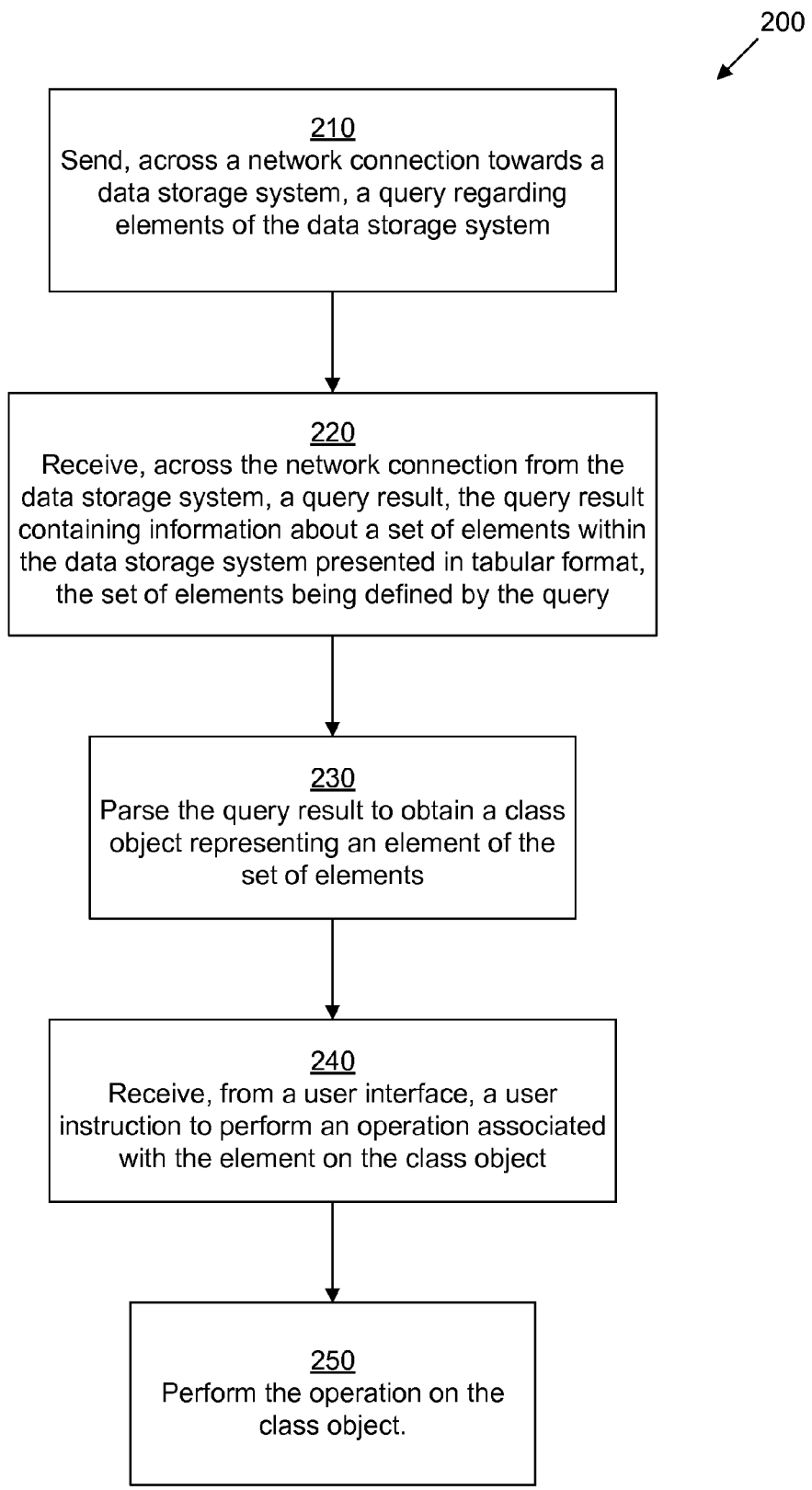

CONVERTING CQL QUERY RESULTS INTO USER-CONTROLLABLE OBJECTS

BACKGROUND

Certain conventional data storage systems use the Common Information Model (CIM) to represent elements of a data storage system (e.g., disks, LUNs, RAID groups, subsystems, etc.). These data storage systems are managed remotely by a conventional client application running on a conventional client system across a network. In order for a conventional client to obtain search results, conventional clients issue a request for all CIM objects maintained by the data storage system of a particular type, and after all such objects are returned to the conventional client, the conventional client performs a local search in order to cull the undesired objects.

In an improved conventional system, the CIM Query Language (CQL) is used by the improved conventional client in order to send a search query to the data storage system. In such systems, instead of returning to the client a set of CIM objects corresponding to the search results, the data storage system sends a table containing data about the desired elements to the improved conventional client.

SUMMARY

Conventional systems suffer from a variety of deficiencies. In particular, when the data storage system sends a large numbers of CIM objects across the network, the network can be flooded and performance can suffer. Also, since client systems are typically slower than servers, performing the actual search on the client can be inefficient. Although the improved conventional systems overcome these deficiencies, because the search is performed on the server and the search results are presented in a table, the client does not have access to the CIM objects, and a user is not able to perform standard operations on the returned results.

In contrast to the above-described approaches, embodiments of the present invention retain the benefits of a tabular response to a CQL query, but also allow a user to perform standard operations on the results by allowing the results from the query to be converted into CIM objects. This is done by intelligently parsing the query results at the client in order to generate the CIM objects.

In one embodiment, a method is provided. The method includes sending, from a client device to a data storage system, a query regarding elements of the data storage system, receiving, at the client device, from the data storage system, a query result, the query result containing information about a set of elements within the data storage system presented in tabular format, the set of elements being defined by the query, parsing the query result, at the client device, to obtain a class object representing an element of the set of elements, and performing an operation associated with the element on the class object.

In another embodiment, a computer program product comprising a tangible computer-readable medium storing instructions is provided. The instructions, when executed by a computer, cause the computer to send, across a network connection towards a data storage system, a query regarding elements of the data storage system, receive, across the network connection from the data storage system, a query result, the query result containing information about a set of elements within the data storage system presented in tabular format, the set of elements being defined by the query, parse the query result to obtain a class object representing an element of the set of elements, receive, from a user interface, a user instruction to perform an operation associated with the element on the class object, and perform the operation on the class object.

In another embodiment, an apparatus is provided. The apparatus includes a user interface, a network interface, memory, and a controller. The controller is configured to send, across the network interface towards a data storage system, a query regarding elements of the data storage system, receive, across the network interface from the data storage system, a query result, the query result containing information about a set of elements within the data storage system presented in tabular format, the set of elements being defined by the query, the query result being stored in memory, parse the query result to obtain a class object representing an element of the set of elements, the class object being stored in memory, receive, from the user interface, a user instruction to perform an operation associated with the element on the class object, and perform the operation on the class object.

BRIEF DESCRIPTION OF THE DRAWINGS

The foregoing and other objects, features, and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

FIG. 2 illustrates an example query for use in conjunction with various embodiments.

FIG. 3 illustrates, in table form, an example query response for use in conjunction with various embodiments.

FIG. 7 illustrates an example method of various embodiments.

DETAILED DESCRIPTION

Embodiments of the present invention retain the benefits of a tabular response to a CQL query, but also allow a user to perform standard operations on the results by allowing the results from the query to be converted into CIM objects. This is done by intelligently parsing the query results at the client in order to generate the CIM objects.

Figure 1:
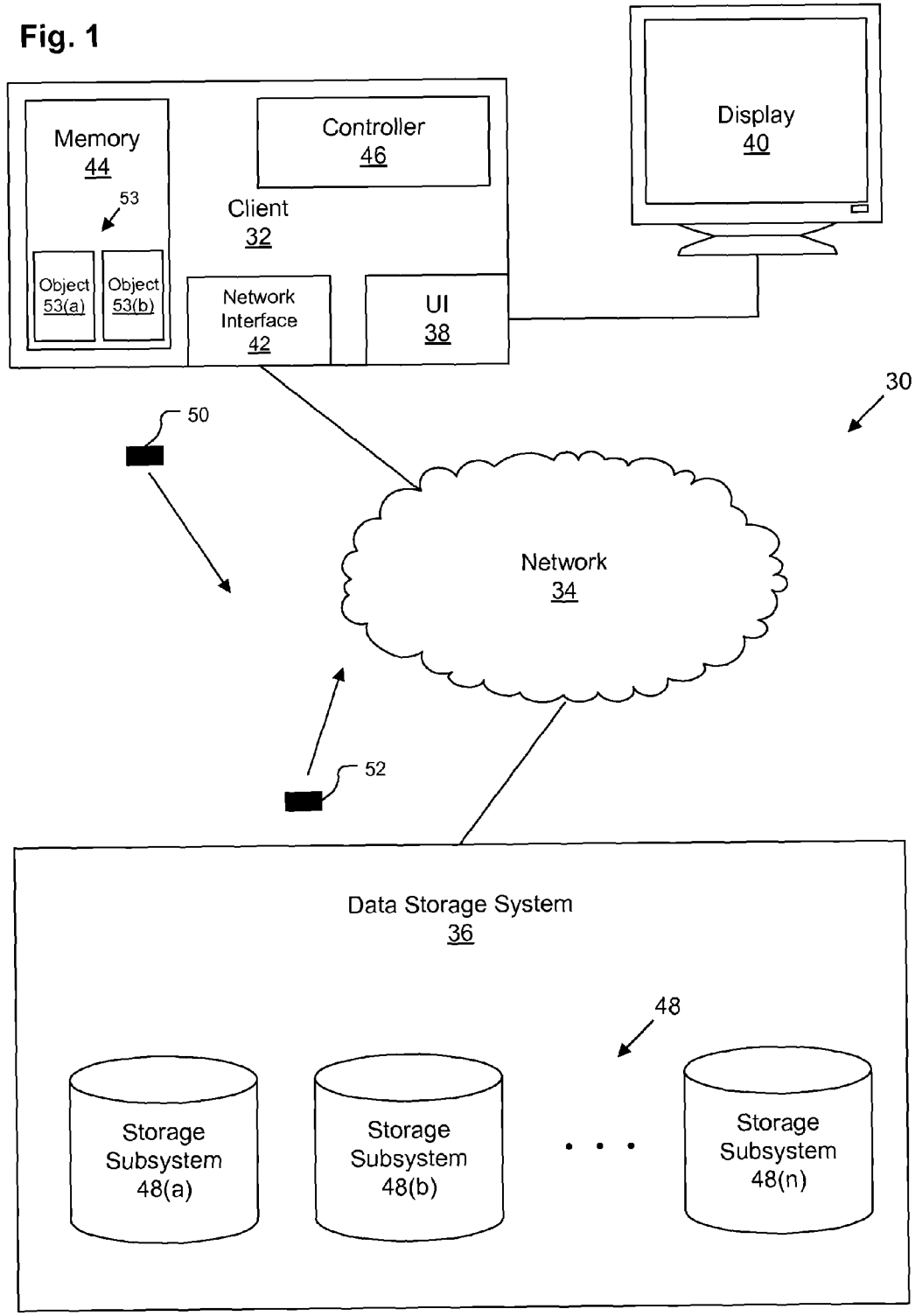
FIG. 1 illustrates an example system for use in conjunction with various embodiments.

FIG. 1 depicts an example system 30 for use in conjunction with various embodiments. System 30 includes a client 32, a network 34 (such as, for example, the Internet or a local area network), and a data storage system 36. Network 34 connects the client 32 and the data storage system 36. Client 32 includes a user interface 38. As depicted, user interface 38 connects to a touch-sensitive display 40 to be able to receive user input as well as to display information to a user. It should be understood, that this is by way of example only. In some embodiments, user interface 38 may connect to a mouse and keyboard (or any other forms of user input devices) as well as to a non-touch-sensitive display 40. It should also be understood that user interface 38 may represent a logical grouping of elements, such as, for example, a set of PS/2 or Universal Serial Bus (USB) interfaces for connecting to input devices as well as a graphics adapter having a graphics port (such as, for example, a VGA, DVI, or HDMI port). Client 32 also includes a network interface 42 for connecting to network 34, memory 44, and a controller 46. Further details with respect to the memory 44 and controller 46 will be provided below throughout the Specification.

Data storage system 36 includes a set of storage subsystems 48 (for example, storage subsystems 48(a), 48(b), . . . , 48(n)) for storing information. In some embodiments, data storage system 36 may be a single server (such as, for example, a CLARiiON CX4 system, produced by the EMC Corporation of Hopkinton, Mass.) housing one or more storage processors and a large number of disks. In other embodiments, data storage system 36 may include a server connected to a set of storage subsystems 48. Data storage system 36 includes a plurality of physical and logical elements, such as, for example, disks, LUNs, RAID arrays, subsystems, servers, and operating systems. Data storage system 36 also manages these elements by maintaining CIM objects in memory to represent each element.

Figure 5:
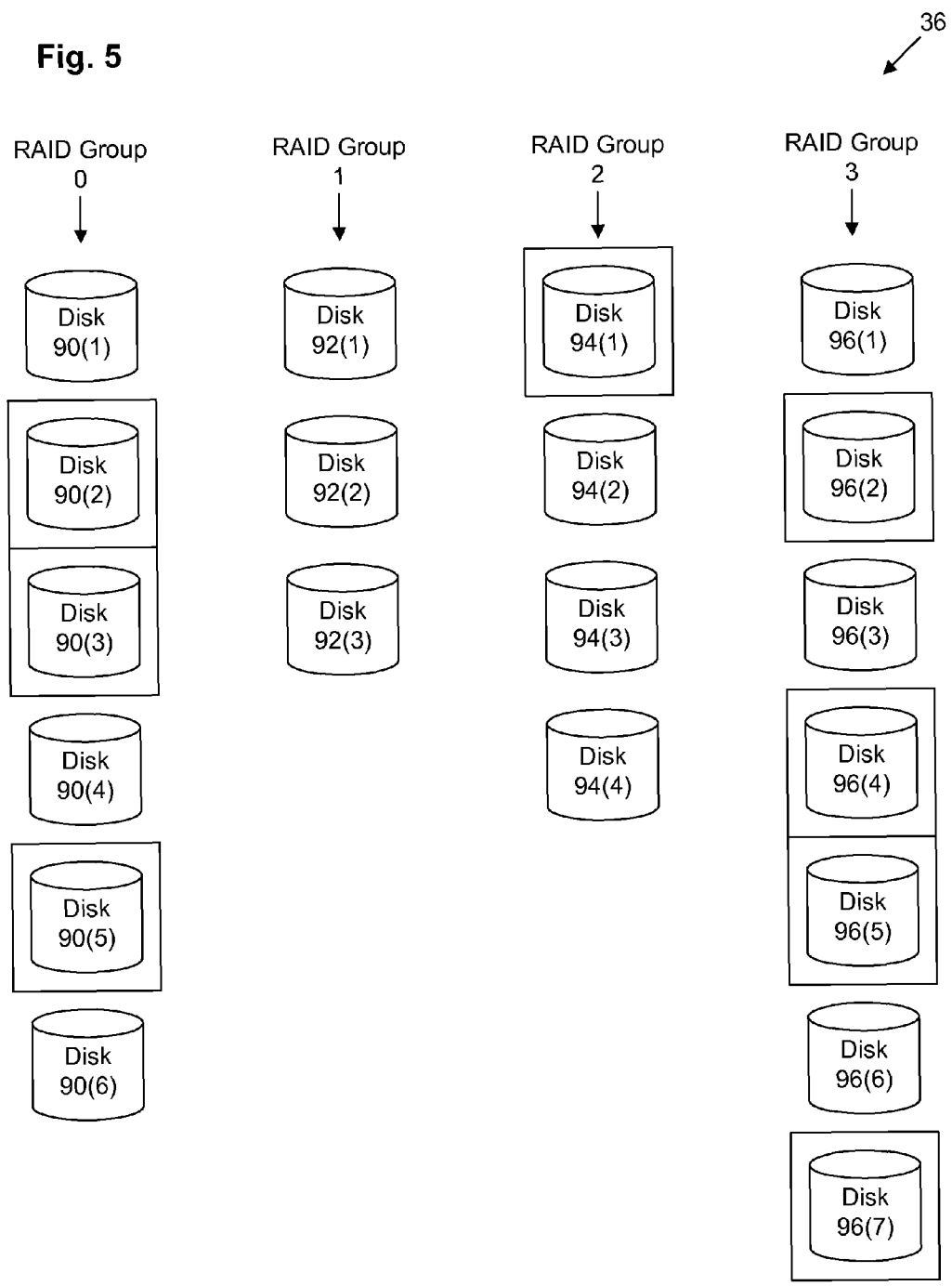
FIG. 5 illustrates an example set of disks and RAID arrays for use in conjunction with various embodiments.

Further detail with respect to the organization of data storage system 36 is provided in FIG. 5. FIG. 5 depicts an example representation of data storage system 36. Data storage system 36 may contain several RAID groups, such as for example, RAID Groups 0, 1, 2, 3, and 4. RAID Group 0 may contain a plurality of disks 90(1-6). RAID Group 1 may contain a plurality of disks 92(1-3). RAID Group 2 may contain a plurality of disks 94(1-4). RAID Group 3 may contain a plurality of disks 96(1-7). It should be understood that the number of disks shown in each RAID group is by way of example only. Each RAID group may contain any number of disks 90-96.

Returning to FIG. 1, in operation, client 32 is configured to send a query 50 (which may be based on user input from the user interface 38) across network 34 towards data storage system 36. In response, data storage system is configured to perform a search based on the query 50 and return a query result 52 to the client 32. The search will identify a set of elements that satisfy the search criteria, and the query result 52 will provide data regarding specific properties of the set of matching elements. Controller 46 is configured to then process query result 52 (as described in further detail below) by parsing the query result 52 into at least one object 53 and storing it in memory 44, and displaying a result on the display 40. It should be noted that more than one object 53 may be created and stored in memory, as depicted by objects 53(a) and 53(b) in FIG. 1.

FIG. 2 depicts an example query 50. Query 50, in one embodiment, is a file in eXtensible Markup Language (XML) format. Query 50 contains a header portion 54, a central query portion 56, and a footer portion 58. Central query portion 56 includes introductory and closing statements surrounding a CQL statement 60 which defines the parameters of the query 50. CQL statement 60 contains a SELECT statement 62, a FROM statement 64, and a WHERE statement 66. FROM statement 64 defines what elements of the data storage system are the subjects of search. WHERE statement 66 defines which particular elements satisfy the conditions of a search. SELECT statement 62 indicates which properties of the matching elements are to be returned to the client in tabular format.

In the example of FIG. 2, the FROM statement 64 indicates that DiskDevice and RAIDGroup elements are the subjects of the search. More accurately, DiskDevice and RAIDGroup are the names of CIM objects which are maintained by the data storage system 36 to represent disk and RAID elements of the data storage system 36, respectively. The WHERE statement 66 includes a set of conditions. In this case, a first condition is DiskDevice.RAIDGroupID=RAIDGroup.RAIDGroupID. This first condition serves to join the DiskDevice and RAIDGroup classes, by indicating that a particular instance of the DiskDevice class is logically linked to a particular instance of the RAIDGroup class when the RAIDGroup class instance has the same RAIDGroupID property as does the DiskDevice class instance. A second condition is DiskDevice.Capacity>1000000000000. This second condition indicates that the capacity of any disk that satisfies the search must be greater than 1,000,000,000,000 bytes (or approximately 1 TB). A third condition is DiskDevice.Vendor LIKE "Seagate". This third condition indicates that any disk that satisfies the search must have been sold by Seagate. Thus, the WHERE statement 66 indicates that the DiskDevice class is joined to the RAIDGroup class by the RAIDGroupID property and it also limits the results of the query to DiskDevice class instances (and corresponding RAIDGroup class instances) that correspond to disks larger than about 1 TB sold by Seagate. The SELECT statement 62 indicates that the query result 52 should have 7 columns, the columns respectively corresponding to (1) the path of each disk (OBJECTPATH(DiskDevice)), (2) the name of each disk (DiskDevice.Name), (3) the capacity of each disk (DiskDevice.Capacity), (4) the current speed of each disk (DiskDevice.CurrentSpeed), (5) the vendor of each disk (DiskDevice.Vendor), (6) the RAID Group ID of each disk (DiskDevice.RAIDGroupID), and (7) the number of LUNs in the RAID group associated with each disk (RAIDGroup.NumberOfLUNs).

As depicted in FIG. 5, several disks 90-96 of data storage system 36 satisfy the conditions of WHERE statement 66 from query 50. These disks are shown inside of boxes. Thus, disks 90(2), 90(3), 90(5), 94(1), 96(2), 96(4), 96(5), and 96(7) have satisfied the search, while the remaining disks have not. It may be noted that disks from RAID Groups 0, 2, and 3 contain disks that satisfy the search, while RAID Group 1 does not contain any disks that satisfy the search.

FIG. 3 depicts an example query result 52 sent back to the client 32 by data storage system 36. Query result 52, in one embodiment, is a file in XML format. The XML file, in addition to various ancillary data, may include a table 68 presented in tagged (XML) format. The table 68 includes a header row 70, which defines the properties presented in each column. In the case of the query 50 depicted in FIG. 2, the header row 70 of the corresponding query result 52 contains 7 cells. In addition to the header row 70, the table 68 of query result 52 contains a plurality of data rows 72 (depicted as data rows 72(a)-72(m). Each data row 72 corresponds to a disk 90-96 that matches the query 50 (e.g., disks 90(2), 90(3), 90(5), 94(1), 96(2), 96(4), 96(5), and 96(7)), and each data row 72 contains cells of values, the values corresponding to the properties listed in the header row 70. In the case of the query 50 depicted in FIG. 2, each data row 72 contains seven cells of values.

Figure 6:
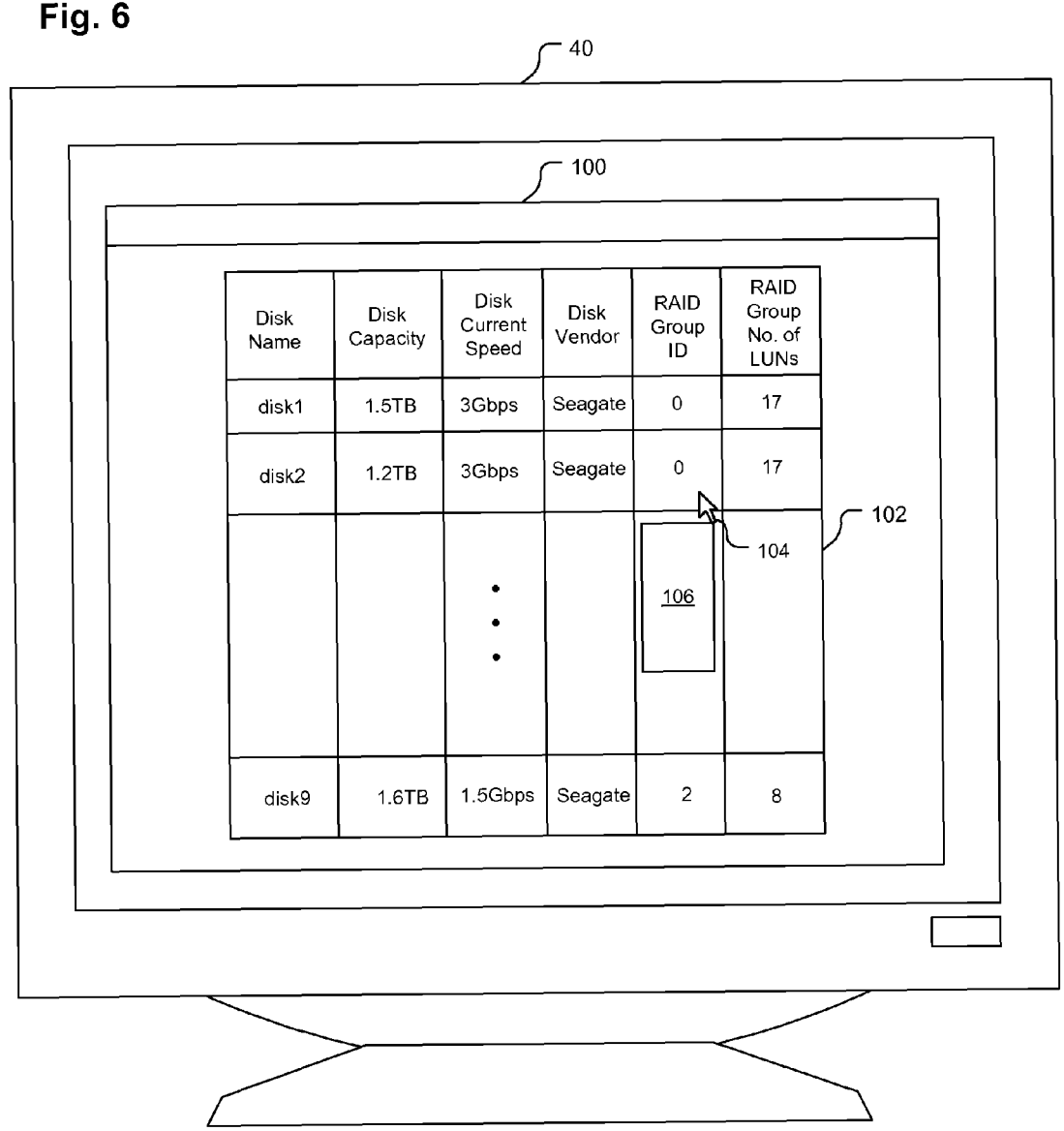
FIG. 6 illustrates an example display in accordance with various embodiments.

FIG. 6 depicts an example display 40 according to one embodiment. After receiving query result 52, controller 46 processes query result 52 and displays within a window 100 on display 40, table 102 as a graphical user interface. Table 102 contains much of the same information presented within the table 68 of query result 52. However, some fields (such as, for example the path of the disk) are not displayed. Thus, table 102 includes 6 columns, corresponding to the columns of the table 68 of query result 52 (excluding non-displaying columns). Table 102 also includes rows corresponding to the various disks 90-96 that satisfy the search of query 50. Each such row contains the corresponding property. Thus, for example, the first data row of table 102 represents disk1, which might, for example, correspond to disk 90(2) of FIG. 5. Disk 90(2) is depicted as having a capacity of 1.5 TB, a current speed of 3 Gbps, being sold by Seagate, and belonging to RAID Group 0. The data row also indicates that RAID Group 0 contains 17 logical units of storage (LUNs).

The user may interact with the graphical user interface and drag a cursor 104 over table 102. If the user clicks the cursor 104 over a particular cell of the table 102, drop-down box 106 appears. Drop-down box 106 presents the user with a choice of several operations to execute with respect to the particular property or element of the row. Further details will be provided below in conjunction with FIG. 7.

FIG. 7 depicts an example method 200 according to one embodiment. In step 210, client 32, under control of controller 46, sends query 50 regarding elements of the data storage system 36, across network interface 42 towards the data storage system 36. Query 50 may be a pre-defined query, or it may be a query generated by the user shortly before being sent. In the latter case, query 50 may either have been typed in by the user, or it may have been entered in by the user via a graphical user interface. Query 50 may be in XML format containing a CQL statement 60 as described above in connection with FIG. 2. Thus, for example, a user may require information regarding all the disks 90-96 in data storage system 36 that have a capacity greater than 1 TB which are made by Seagate. In that case, the example query 50 depicted in FIG. 2 would be appropriate.

Data storage system 36, upon receiving the query 50, performs a search based on the CQL statement 60. CIM objects, representing the elements of the data storage system 36 and stored in memory of the data storage system 36, are searched to provide the data for the query response 52.

In step 220, in response to sending the query 50, client 32 receives from the data storage system 36, across network interface 42, query result 52, the query result 52 containing information about a set of elements within the data storage system 36 presented in tabular format, the set of elements being defined by the query 50. Query result 52 may be an XML file containing a table 68 with CIM data as described above in connection with FIG. 3.

In step 230, in response to receiving the query result 52, controller 46 parses the query result 52 to obtain a class object 53 representing an element of the set of elements described in the query result 52.

Figure 4:
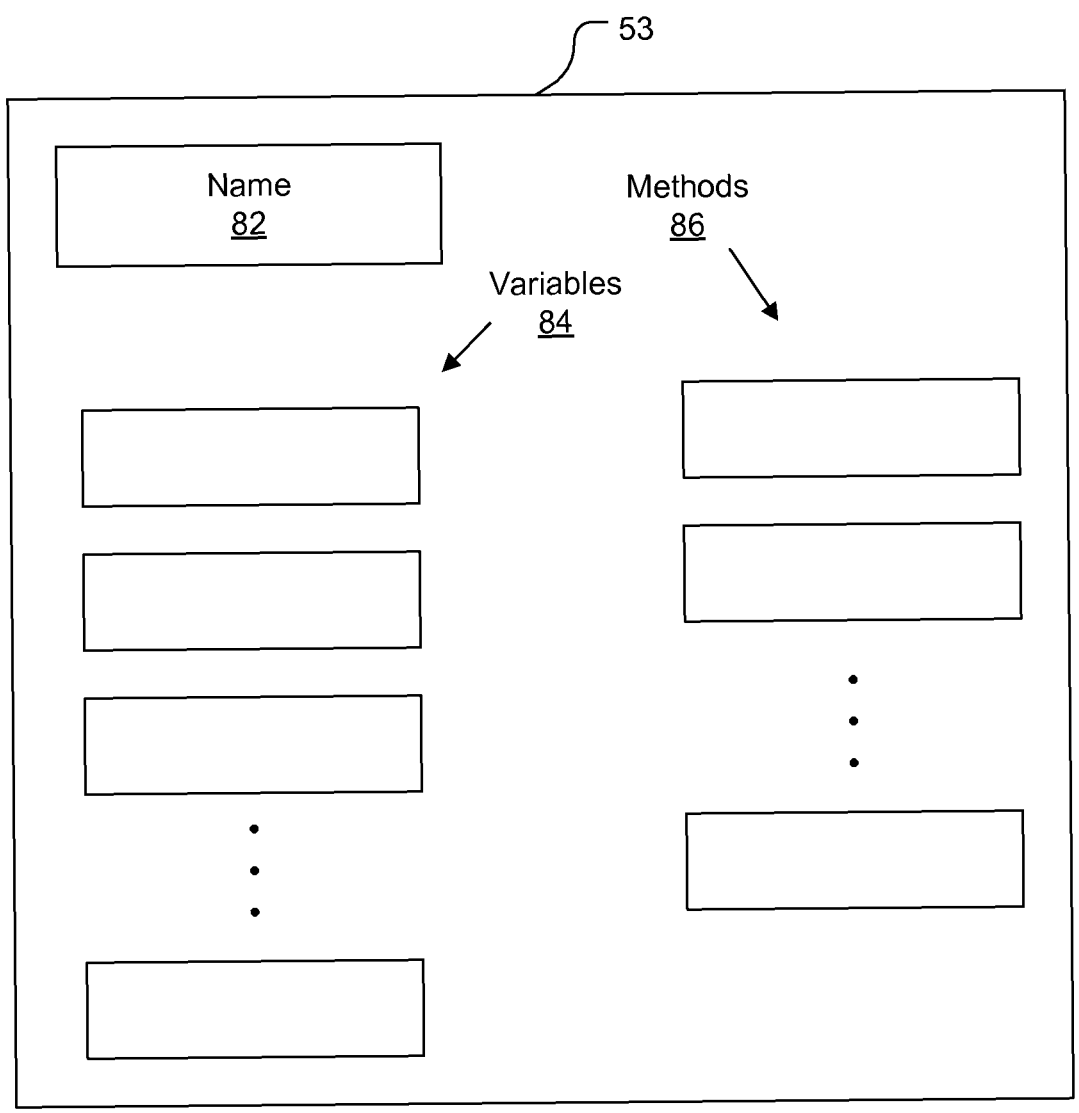
FIG. 4 illustrates an example object for use in conjunction with various embodiments.

FIG. 4 depicts an example object 53 for use in conjunction with various embodiments. Object 53 is an instance of a CIM object class. It may be a Java object, a C++ object, a hybrid object, or some other type of object. In some embodiments, object 53 is created in memory 44 by controller 46 to represent data found in each data row 72 of query result 52. Object 53 contains a name 82 as well as a set of object variables 84 (which may include both class variables and instance variables). Object 53 also contains references to a set of methods 86 (which may include both class methods and instance methods).

Returning to the description of step 230 of FIG. 7, further detail is provided with regard to the parsing. Controller 46 creates an instance 53 (it should be noted that creating an instance of a class may also be referred to as "instantiating") of a CIM class in memory 44 and populates the fields 82, 84 of that object 53 (see FIG. 4) with values from a particular row 72 of the table 68 (see FIG. 3). This is done by correlating the particular fields 82, 84 with particular column headers from the header row 70 of the table 68, and saving the values within the cells from the particular row 72 corresponding to each particular column header in the corresponding variable 82, 84.

With continued reference to step 230 of FIG. 7, parsing the query result 52 to obtain the class object 53 (see FIG. 4) includes reading a header row 70 (see FIG. 3) of the plurality of rows, the header row 70 defining a list of properties stored within each row 72 of the table 68 (e.g., DiskDevice.Capacity, DiskDevice.CurrentSpeed, etc.). It further includes reading one row 72 (e.g., row 72(a)) of the query result 52, the one row 72(a) being distinct from the header row 70, dividing the one row 72(a) into a set of individual data values (e.g., by defining each data value as the data presented between a pair of XML tags defining a cell or value), correlating each data value with a corresponding property defined within the header row 70, creating, in memory 44, an instance 53 of a class corresponding to an element of the data storage system 36 (such as, for example, a disk, by instantiating a DiskDevice class), and storing each individual data value within a variable 82, 84 of the instance 53 of the class having a name corresponding to the respective corresponding property name.

There are several possible ways for this parsing to be done. In one embodiment, the query result 52 only includes properties from one type of element in the table 68. For example, table 68 may only include properties of disks (to the exclusion of RAID groups, LUNs, etc.). In that case, object 53 represents a particular element of the data storage system 36 and is analogous to the CIM object representing that very same element stored within memory of the data storage system 36 (although, object 53 may contain fewer variables, if not all the properties of the CIM object from the data storage system 36 were sent across the network 34).

In another embodiment, the query result 52 includes properties from more than one type of element of the data storage system 36. For example, as described above in connection with FIGS. 2, 3, and 6, query result 52 may contain properties of both disks and corresponding RAID groups. The parsing includes detecting that a row 72 includes some data values corresponding to properties of a first element of the data storage system 36 (e.g, a disk) and other data values that correspond to properties of a second element of the data storage system 36 (e.g, a RAID group). When parsing the table 68, a separate object 53 is created to correspond to each such element. Thus, looking at the first data row of table 102 in FIG. 6, one object 53(a) is created to represent disk1 90(2). This object 53(a) has name 82 "disk1" and it contains variables 84 Capacity=1.5 TB, Current Speed=3 Gbps, Vendor="Seagate", and RAIDGroupID=0. A second object 53(b) is also created to represent the associated RAIDGroup element. This object 53(b) has name 82 "RAIDGroup 0" and it includes a variable 84 NumberOfLUNs=17. It should be understood that care should be taken to prevent multiple RAIDGroup objects from being created to represent the same RAIDGroup when associated with multiple disks.

In another embodiment the query result 52 again includes properties from more than one type of element of the data storage system. For example, as described above in connection with FIGS. 2, 3, and 6, query result 52 may contain properties of both disks and corresponding RAID groups. The parsing includes detecting that a row includes some data values corresponding to properties of a first element of the data storage system 36 (e.g, a disk) and other data values that correspond to properties of a second element of the data storage system 36 (e.g, a RAID group). When parsing the table, only a single object 53 is created for each row 72 of the table 68, even though the row 72 contains data for multiple elements. The data from the multiple elements is all stored together within the one object 53. The object 53 may be identified by a primary element type. Thus, looking at the first data row of table 102 in FIG. 6, one object 53 is created to represent disk1 90(2). This object has name "disk1" and it contains variables Capacity=1.5 TB, Current Speed=3 Gbps, Vendor="Seagate", and RAIDGroupID=0. The object also stores a variable RAIDGroup.NumberOfLUNs=17 to represent the number of LUNs in the RAIDGroup associated with disk 90(2).

In one embodiment, all rows 72 of the table are parsed immediately in response to the controller 46 receiving the query result 52. In another embodiment, individual rows 72 are parsed in response to a user clicking on the corresponding row of table 102 on the display 40 with cursor 104.

Continuing with the description of FIG. 7, in step 240, the controller 46 receives, from user interface 38, a user instruction to perform an operation associated with the element on the class object 80. In one arrangement, user clicks on a cell of the table 102 with cursor 104. In response, drop-down box 106 is displayed, listing possible actions. The user is then able to select the particular operation that is desired. For example, drop-down box 106 may present an option to display the element in context within the data storage system 36. In order to do this, additional data may be required. If that is the case, controller 46 submits a request to the data storage system 36 (across network interface 42) for more information about the element (as depicted in FIG. 6, this might be disk2, which might refer to disk 90(3) of FIG. 5). Drop-down box 106 may also contain the option to switch disk 90(3) from being in RAID Group 0 to instead be in RAID Group 1 (or 2 or 3). Drop-down box 106 may also contain other possible options, such as, for example, resetting disk 90(3), re-formatting disk 90(3), etc. Possible operations also include but are not limited to getInstanceName, getInstanceName, associators, executeMethod, registerNetworkObserver, deregisterNetworkObserver, and refreshProperties. These are all standard CIM operations that may be performed on a CIM object, such as object 53.

In step 250, the controller 46 performs the requested operation. Because the operation is performed on object 53, which is a standard CIM object, controller 46 is able to perform the operation as if the operation were being performed on any element of the data storage system displayed in its normal context even though the element is being displayed in a search result table 102.

While various embodiments of the invention have been particularly shown and described, it will be understood by those skilled in the art that various changes in form and details may be made therein without departing from the spirit and scope of the invention as defined by the appended claims.

It should be understood that although various embodiments have been described as being methods, software embodying these methods is also included. Thus, one embodiment includes a tangible computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Furthermore, it should be understood that all embodiments which have been described may be combined in all possible combinations with each other, except to the extent that such combinations have been explicitly excluded. Any impossible combinations are explicitly excluded.

What is claimed is:

1. A method comprising:

sending, from a client device to a data storage system, a query regarding elements of the data storage system;

receiving, at the client device, from the data storage system, a query result, the query result containing information about a set of elements within the data storage system presented in tabular format, the set of elements being defined by the query;

parsing the query result, at the client device, to obtain a class object representing an element of the set of elements; and performing an operation associated with the element on the class object;

wherein:

the query result includes a table, the table including a plurality of rows, each row storing a fixed number of data values and each row corresponding to at least one unique element of the data storage system;

parsing the query result to obtain the class object includes:

reading a header row of the plurality of rows, the header row defining a list of properties stored within each row of the table;

reading one row of the query result, the one row being distinct from the header row;

dividing the one row into a set of individual data values;

correlating each data value with a corresponding property defined within the header row;

creating, in memory, an instance of a class corresponding to an element of the data storage system; and storing each individual data value within a variable of the instance of the class having a name corresponding to the respective corresponding property name; and each element of the data storage system has exactly one type, the type being chosen from a set including disks, logical units of storage (LUNs), array groups (RAID groups), subsystems, and servers;

creating, in memory, the instance of a class corresponding to the element of the data storage system includes:

detecting that the one row includes some data values corresponding to properties of a first element of the data storage system and other data values corresponding to properties of a second element of the data storage system, the first element and the second element being of different types;

instantiating a first class that represents elements of a type of the first element; and instantiating a second class that represents elements of a type of the second element;

storing each individual data value within the variable of the instance of the class having the name corresponding to the respective corresponding property name includes:

storing each data value that corresponds to a property of the first element within a variable of the first class having a name corresponding to the respective corresponding property name; and storing each data value that corresponds to a property of the second element within a variable of the second class having a name corresponding to the respective corresponding property name;

the first element is a disk;

the first class is a class that represents disks, the instantiated first class being a disk object;

the second element is a RAID group, the disk being a member of the RAID group, the RAID group having a RAID group identifier;

the second class is a class that represents RAID groups, the instantiated second class being a RAID group object;

storing each data value that corresponds to a property of the first element within a variable of the first class having a name corresponding to the respective corresponding property name includes:
- storing a value representing a capacity of the disk in a capacity variable of the disk object;
- storing a value representing a speed of the disk in a speed variable of the disk object;
- storing the RAID group identifier in a RAID group ID variable of the disk object; and storing each data value that corresponds to a property of the second element within a variable of the second class having a name corresponding to the respective corresponding property name includes:
- storing a value representing the RAID group ID in a name variable of the RAID group object; and
- storing a value representing a number of logical units in the RAID group in a Number of LUNs variable of the RAID group object.

2. A method comprising:

sending, from a client device to a data storage system, a query regarding elements of the data storage system;

receiving, at the client device, from the data storage system, a query result, the query result containing information about a set of elements within the data storage system presented in tabular format, the set of elements being defined by the query;

parsing the query result, at the client device, to obtain a class object representing an element of the set of elements; and performing an operation associated with the element on the class object;

wherein:
- the query result includes a table, the table including a plurality of rows, each row storing a fixed number of data values and each row corresponding to at least one unique element of the data storage system;
- parsing the query result to obtain the class object includes:
  - reading a header row of the plurality of rows, the header row defining a list of properties stored within each row of the table;
  - reading one row of the query result, the one row being distinct from the header row;
  - dividing the one row into a set of individual data values;
  - correlating each data value with a corresponding property defined within the header row;
  - creating, in memory, an instance of a class corresponding to an element of the data storage system; and
  - storing each individual data value within a variable of the instance of the class having a name corresponding to the respective corresponding property name; and
- each element of the data storage system has exactly one type, the type being chosen from a set including disks, logical units of storage (LUNs), array groups (RAID groups), subsystems, and servers;
- creating, in memory, the instance of a class corresponding to the element of the data storage system includes:
  - detecting that the one row includes some data values corresponding to properties of a first element of the data storage system and other data values corresponding to properties of a second element of the data storage system, the first element and the second element being of different types, the first element being designated as a primary element; and
  - instantiating a primary class that represents elements of a type of the first element;
- storing each individual data value within the variable of the instance of the class having the name corresponding to the respective corresponding property name includes:
  - storing each data value that corresponds to a property of the first element within a variable of the primary class having a name corresponding to the respective corresponding property name; and
  - storing each data value that corresponds to a property of the second element within a variable of the primary class having a name corresponding to the respective corresponding property name, such variable name also indicating that it is associated with a second element type;
- the first element is a disk;
- the primary class is a class that represents disks, the instantiated primary class being a disk object;
- the second element is a RAID group, the disk being a member of the RAID group, the RAID group having a RAID group identifier;
- storing each data value that corresponds to a property of the first element within a variable of the first class having a name corresponding to the respective corresponding property name includes:
  - storing a value representing a capacity of the disk in a capacity variable of the disk object;
  - storing a value representing a speed of the disk in a speed variable of the disk object; and
  - storing the RAID group identifier in a RAID group ID variable of the disk object; and
- storing a value representing a number of logical units in the RAID group in a Number of LUNs variable of the RAID group object includes storing a value representing a number of logical units in the RAID group in a Number of LUNs variable of the disk object.

* * * * *